United States Patent
Wokhlu et al.

(10) Patent No.: US 9,983,995 B2
(45) Date of Patent: May 29, 2018

(54) DELAYED WRITE THROUGH CACHE (DWTC) AND METHOD FOR OPERATING THE DWTC

(71) Applicant: Futurewei Technologies, Inc., Plano, TX (US)

(72) Inventors: Sushma Wokhlu, Frisco, TX (US); Alan Gatherer, Richardson, TX (US); Ashish Rai Shrivastava, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 81 days.

(21) Appl. No.: 15/131,779

(22) Filed: Apr. 18, 2016

(65) Prior Publication Data

US 2017/0300414 A1    Oct. 19, 2017

(51) Int. Cl.
| | |
|---|---|
| *G06F 12/00* | (2006.01) |
| *G06F 12/0831* | (2016.01) |
| *G06F 12/0877* | (2016.01) |
| *G06F 12/0893* | (2016.01) |

(52) U.S. Cl.
CPC ...... *G06F 12/0831* (2013.01); *G06F 12/0877* (2013.01); *G06F 12/0893* (2013.01); *G06F 2212/621* (2013.01)

(58) Field of Classification Search
None
See application file for complete search history.

(56) References Cited

U.S. PATENT DOCUMENTS

| | | | | |
|---|---|---|---|---|
| 5,796,980 A * | 8/1998 | Bowles | ............... | G06F 12/0811 711/144 |
| 8,738,860 B1 * | 5/2014 | Griffin | ............... | G06F 12/0897 711/122 |
| 2007/0186044 A1 * | 8/2007 | Fowles | ............... | G06F 9/52 711/130 |
| 2010/0241812 A1 | 9/2010 | Bekoou | | |
| 2010/0287339 A1 * | 11/2010 | Olszewski | ............ | G06F 12/084 711/128 |
| 2013/0254488 A1 * | 9/2013 | Kaxiras | ............... | G06F 12/0815 711/130 |
| 2013/0282987 A1 | 10/2013 | Koob et al. | | |
| 2014/0032858 A1 * | 1/2014 | Rajagopalan | ....... | G06F 12/0833 711/146 |
| 2014/0040551 A1 * | 2/2014 | Blainey | ............... | G06F 12/0833 711/122 |
| 2014/0052933 A1 * | 2/2014 | Mace | ................... | G06F 12/0835 711/146 |
| 2015/0106567 A1 * | 4/2015 | Godard | ............... | G06F 12/0893 711/121 |

FOREIGN PATENT DOCUMENTS

| | | |
|---|---|---|
| CN | 1545033 A | 11/2004 |
| CN | 102063406 A | 5/2011 |

* cited by examiner

*Primary Examiner* — John A Lane
(74) *Attorney, Agent, or Firm* — Slater Matsil, LLP

(57) ABSTRACT

A cache and a method for operating a cache are disclosed. In an embodiment, the cache includes a cache controller, data cache and a delay write through cache (DWTC), wherein the data cache is separate and distinct from the DWTC, wherein cacheable write accesses are split into shareable cacheable write accesses and non-shareable cacheable write accesses, wherein the cacheable shareable write accesses are allocated only to the DWTC, and wherein the non-shareable cacheable write accesses are not allocated to the DWTC.

19 Claims, 4 Drawing Sheets

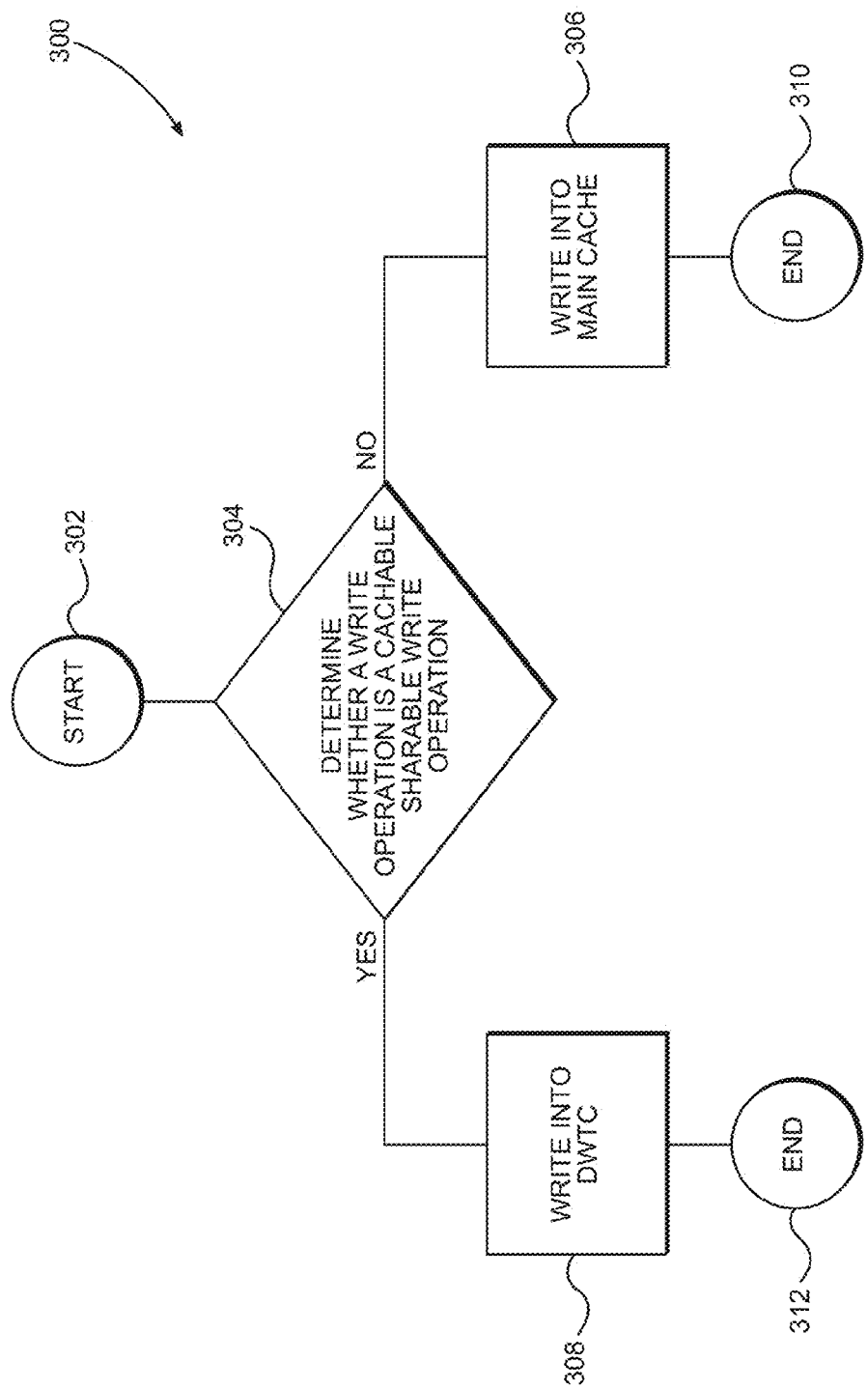

DELAYED WRITE THROUGH CACHE (DWTC) AND METHOD FOR OPERATING THE DWTC

TECHNICAL FIELD

The present invention relates generally to a system and method for operating memory media in multicore or multiprocessor systems, and, in particular embodiments, to a system and method for operating caches in multicore or multiprocessor systems.

BACKGROUND

In multicore or multiprocessor systems each processor has a local cache. The system must guarantee cache coherence. False sharing occurs when threads on different processors modify variables that reside on the same cache line. This invalidates the cache line and forces an update, which hurts performance.

SUMMARY

In accordance with various embodiments a cache comprises a hardware cache controller, a main cache and a delay write through cache (DWTC), wherein the main cache is separate and distinct from the DWTC, wherein cacheable write accesses are split into shareable cacheable write accesses and non-shareable cacheable write accesses, wherein the shareable cacheable write accesses are allocated only to the DWTC, and wherein the non-shareable cacheable write accesses are not allocated to the DWTC.

In accordance with various other embodiments a system comprises a plurality of processors, each processor comprising a hardware cache split into a main cache and a delay write through cache (DWTC), wherein the main cache is separate and distinct from the DWTC, wherein cacheable write accesses are split into shareable cacheable write accesses and non-shareable cacheable write accesses, wherein the shareable cacheable write accesses are allocated only to the DWTC, and wherein the non-shareable cacheable write accesses are not allocated to the DWTC, a bus connecting the plurality of processors and a shared main memory connected to the bus.

In accordance with further various embodiments a method for operating a processor, comprises determining whether a write operation is a cacheable shareable write operation or a cacheable non-shareable write operation, writing data into a hardware delay write through cache (DWTC) when the write operation is a cacheable shareable write operation and writing the data into a hardware main cache when the write operation is a cacheable non-shareable write operation, wherein the DWTC is separate and distinct from the main cache.

In accordance with yet further embodiments a method for receiving a coherent determination signal at a first processor from a second processor in a multicore system comprises receiving the coherent determination signal for an address of a sharable cache line located in a hardware cache of the first processor and solely searching a delay write through cache (DWTC) for the address, wherein the hardware cache comprises the DWTC and a main cache, and wherein the DWTC is separate and distinct from the main cache.

BRIEF DESCRIPTION OF THE DRAWINGS

For a more complete understanding of the present invention, and the advantages thereof, reference is now made to the following descriptions taken in conjunction with the accompanying drawings, in which:

FIG. 3A shows a method for allocating data to a cache; and

DETAILED DESCRIPTION OF ILLUSTRATIVE EMBODIMENTS

False sharing occurs when threads on different cores modify different variables that reside on the same cache line (or cache block). When a processor writes back the full cache line to the shared main memory it can overwrite other processors data resulting in corrupted data.

To ensure data consistency across multiple caches, multicore systems follow different coherency protocols. For example, the systems may perform a MESI (Modified Exclusive Shared Invalid) protocol or make cache write throughs. However, these operations degrade application performance, are expensive and energy inefficient.

Embodiments of the invention provide an efficient, scalable and cost effective solution to false sharing without compromising performance and area. Embodiments provide small hardware delayed write through cache (DWTC) for each core. The hardware cache may be separated into two regions, e.g., a main or regular cache region and a DWTC region. These regions may be distinct and separate from each other. Alternatively, the DWTC may be an additional hardware cache so that the main cache and the DWTC are two separate and distinct hardware devices. The DWTC may be a small cache only a few cache lines deep.

Various embodiments provide that cacheable accesses are separated into shareable accesses and non-shareable accesses. Sharable write accesses may (only) access the DWTC and non-shareable write accesses may (only) access the main (data) cache. The shareable write accesses take the traditional write through path and stay in DWTC for subsequent writes to the same cache line and may merge all the write operations for the same cache line. Other embodiments provide cache lines and caches with byte enables.

Some embodiments provide that coherent determination signals (e.g., snoop signals looking for dirty bit lines) are sent from one processor to another for searching addresses of the shared cache line in the cache. In various embodiments the coherent determination signal searches only the DWTC and not the main (data) cache. Advantageously, since the DWTC is only a few cache lines deep, it is easy, fast and efficient to locate shareable (dirty) cache lines.

Figure 1:
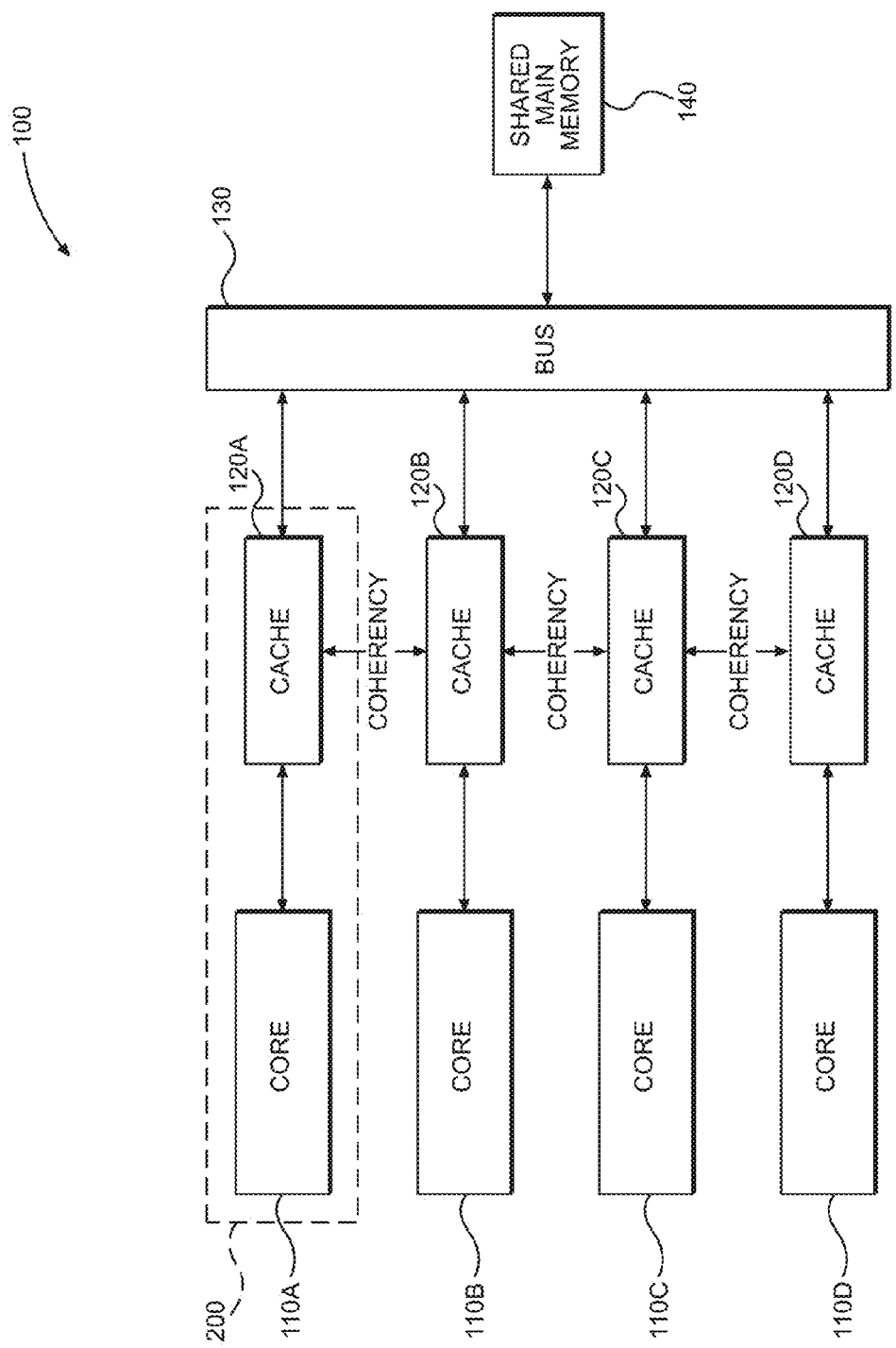
FIG. 1 shows a multiprocessor system with a shared main memory.
Figure 2:
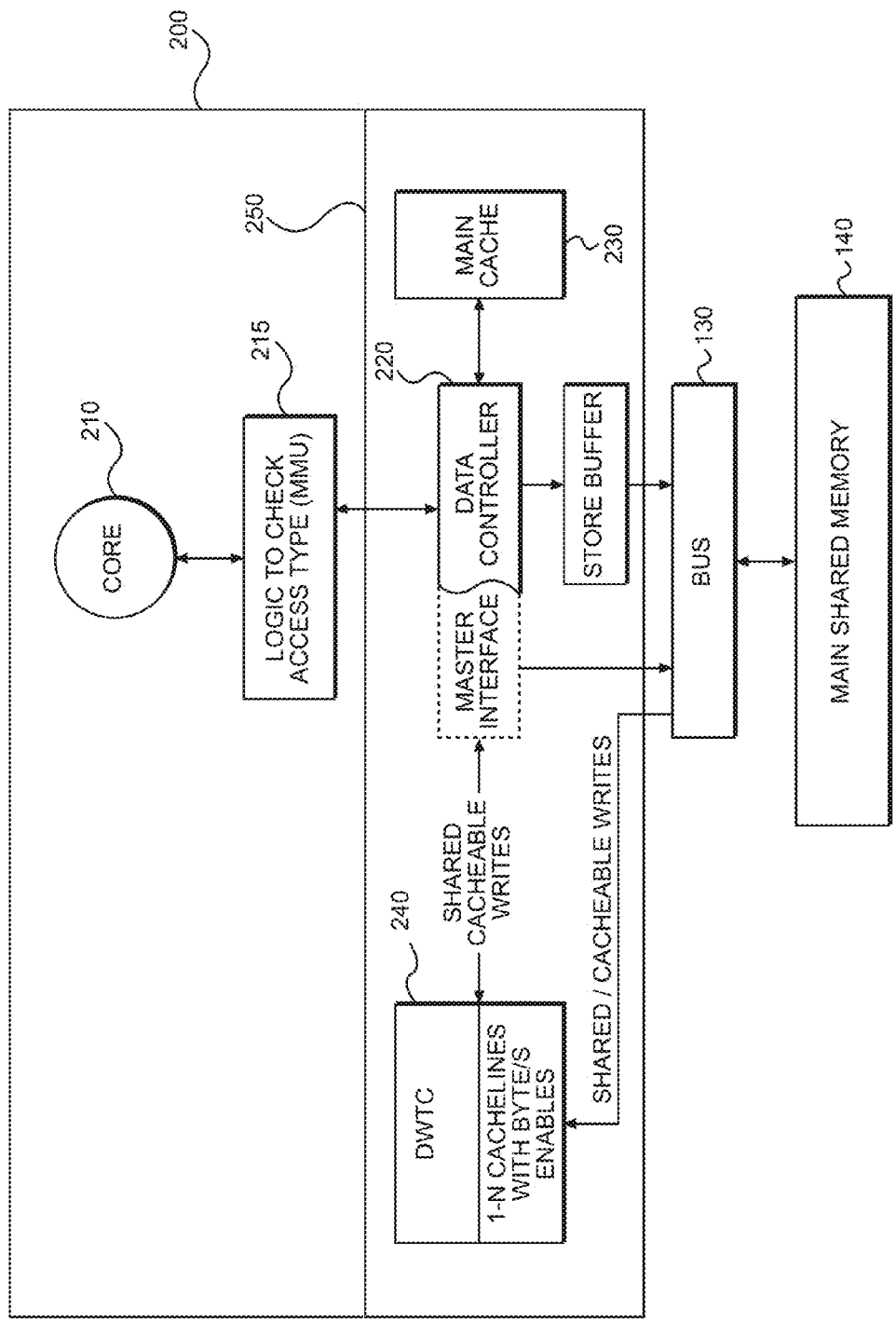
FIG. 2 is a processor connected to the shared main memory via a bus.

FIG. 1 shows such a multicore system 100 comprising a plurality of cores 110A-110D. Each core has an associated local cache 120A-120D. The cores 110A-110D and caches 120A-120D are connected to the shared main memory 140 via a bus 130. FIG. 2 shows a portion of the multicore system 100. Processor 200 is connected to the shared main memory 140 via the bus 130. The processor 200 comprises a core 210, a data cache controller 220, a main (data) cache 230 and a delayed write through cache (DWTC) 240. The processor 200 may further comprise a memory management unit (MMU) 215. The system 100 may comprise a plurality of processors 200. Each of the processors 200 is connected to the bus 130 and the bus 130 is connected to the shared main memory 140.

The core 210 may a computer hardware unit or an independent processing unit configured to read, execute and process program instructions. The instructions may be ordinary CPU instructions such as add, subtract and other operations such as moving data. The core 210 can be implemented as part of a central processing unit (CPU) or as a separate integrated circuit. The core 210 is configured to make different read or write access requests to the cache using different access flags.

The MMU 215 is a computer hardware unit having all memory references passed through it, primarily performing the translation of virtual memory addresses to physical addresses. The MMU 215 can be implemented as part of the CPU or as a separate integrated circuit. The MMU may be programmed with different flags for different regions. In various embodiments the smallest region comprises 4K bytes.

The cache 250 is a computer hardware unit comprising a cache controller 220, a main (data) cache 230 and a DWTC 240. The cache 250 is configured to reduce the average time to access data from the main memory 140. The cache 250 stores copies of the data from the main memory 140. The core 210 may have different independent caches 250, where the main cache 230 is usually organized as a hierarchy of more cache levels (L1, L2, etc.). The cache 250 may be a non-volatile memory such as a (embedded) DRAM or a (embedded) SRAM. The cache 250 can be implemented as part of the CPU or as a separate integrated circuit.

The DWTC 240 may be a specifically dedicated region of the cache 250 separated from the main cache region 230. Alternatively, the DWTC 240 may be an additional hardware cache so that the system 200 includes two separate and distinct hardware caches, a DWTC 240 and a main cache 230. The DWTC 240 may be a few cache lines deep. The DWTC 240 may be 4-N line deep, wherein N is an integer. For example, the DWTC 240 comprises four (4) or eight (8) cache lines. Alternatively, the DWTC 240 comprises sixteen (16) cache lines. In various other embodiments the DWTC 240 comprises less than and equal to 16 or 32 cache lines. The DWTC 240 may be a small fully associative cache.

In various embodiments the DWTC 240 is a fully enabled cache. The granularity of the cache (e.g., enable signal (bit)) may vary. For example, the DWTC 240 is a fully byte enabled cache, a fully double byte enable cache, a fully word enable cache, a fully double-word enable cache or a fully sub-cache line enable cache, etc.

The shared main memory 140 may be a non-volatile or volatile memory. For example, the volatile memory may be a DRAM. In some embodiments, the shared main memory 140 may be a SRAM or MRAM. In other embodiment, the shared main memory 140 may comprise another type of memory. The main memory 140 may be an external memory, e.g., external to the processor 200.

All read or write accesses of the core 210 are routed through the cache controller 220 and based on the access type, the accesses are forwarded accordingly. Non-cacheable read or write accesses to the shared main memory 140 are routed via the bus 130 bypassing the cache 250 and the data cache controller 220.

A cacheable read access is routed to the cache 250. The cache 250 is checked for a hit or a miss. If the access is a shareable read access, the main cache 230 and the DWTC 240 are searched and if the search provides a hit then the latest copy of the cache line is presented to the core 210. If the access is a non-shareable read access, only the main cache 230 (and not the DWTC 240) is searched and if the search provides a hit the latest copy of the cache line is presented to the core 210.

A cacheable write access is routed to the cache 250. The cache 250 is checked for a hit or a miss. If it is a shareable write access the main cache 230 is searched and if it is a hit, the cache line is moved from the main cache 230 to the DWTC 240. Of course, the DWTC 240 is searched too and if it is a hit the cache line is modified in the DWTC 240. If it is a shareable write access and if it is a miss, the core 210 allocates the cache line to the DWTC 240. If the write access is a non-shareable write access and if it is a hit in the main cache 230, the cache line is updated in the main cache 230. If the write access is a non-shareable write access and if it is a miss in the main cache 230, the core 210 allocates the cache line to the main cache 230. The DWTC 240 is not searched for such an operation. In various embodiments, all shareable cache lines that have been modified by the core 210 are located in the DWTC 240.

Advantageously the system 100 does not need to perform the search operation for shareable modified cache lines (or in other words dirty line) in the entire cache 250 but only in the DWTC 240 because this is the only place where the core 210 does the modifications.

The cache line in the DWTC 240 may be removed by a coherence operation. For example, the core 110B may send a coherent determination signal with respect to a specific cache line to the processor 200. After receiving the coherent determination signal the core 210/110A may write back the cache line to the shared main memory 140. When a write back happens, the full cache line is sent to the main memory 140 including the write enable. The main memory 140 only updates the bytes with write enable and discards the other bytes by invalidation operation.

In other embodiments, the cache line may be written back or removed because the DWTC 240 is short of space such as replacement of old line by replacement policy.

In various embodiments the cache lines may be removed from the DWTC 240 by writing them back to the shared main memory 140 when: (1) a line needs to be replaced, (2) a specific instruction to write back is received or (3) the end of any thread is reached. The lines may be allocated to the DWTC 240 when a core 210 makes a write request and: (1) when it is a write hit in the main cache 230, the cache line is moved to and modified in the DWTC or (2) when it is a miss, the cache line is allocated to DWTC 240. The core 210 can issue write back anytime from the DWTC 240 at programmable sync points or through (hardware or software) triggers.

In various embodiments the processors 120A-120D may share the same cache line. In contrast to true sharing (processors share the same byte of the same cache line), false sharing means multiple processors 120A-120D are sharing different parts of the same cache line. This means that different processors 120A-120D can access and modify the cache line at the same time. In particular, each processor 120A-120D may access a different portion of this cache line. The first processor 120A may modify the first portion of the cache line (comprising 64 bytes, in other examples, the line could be 32 bytes or 128 bytes) and the second processor 120B may modify a second portion of the line. In various embodiments accessing different portions (variable) of the same cache line by different processors 120A-120D may be guaranteed via byte enables.

Because the processors 120A-120D use and modify different portions (variable) of the line, they do not need to write back the cache line to the shared main memory 140.

However, if an additional processor, e.g., processor 120C, wants to access the first portion of the cache line used by the first processor a coherent determination signal (e.g., a snoop signal) is sent from the third core 110C to the first core 110A and the whole cache line including the first portion of the cache line is written back to the main memory 140 and the main memory 140 is updated (true sharing cores 110A-110D want to modify the same portion or part of the line). The line is then removed from the DWTC 240. Multiple core systems 100 can modify multiple portions or parts of the same line without writing back the line to the shared main memory 140. If a further core needs that line the further core can send a coherent determination signal (snoop signal) to require writing back the cache line to the main memory 140.

Embodiments of the invention allow overcoming the false sharing problem because the DWTCs 240 are fully byte enabled caches. For example, each byte of a cache line has a write enable (qualifier). The write enable qualifies the byte as being modified or not modified. The byte enable may be the size of a bit. For example, if there is a 64 byte cache line and 8 processors are accessing 8 different portions of the cache line each processor modifies one portion of the cache line. If a first processor writes back the modified cache line to the shared main memory, the first processor writes back the modified portion of the cache line and only this portion is updated in the main memory. The other portions of the cache line are not updated by the first processor (but may be by the other processors). In other words, the write back is not updating the entire cache line in the main memory but only a portion or portions of the line which has been modified by the respective processor. Accordingly, multiple processors can own, modify and update the cache line at the same time.

Manufacturers typically integrate the cores onto a single integrated circuit die no n as a chip multiprocessor or CMP), or onto multiple dies in a single chip package.

FIG. 3A shows a flow chart 300 for allocating data to a cache. The process starts at block 302 where a core or processor is configured to write data to a cache. The core or processor determines whether the write operation is a cacheable shareable write or a cacheable non-shareable write in decision block 304. If it is a cacheable non-shareable write, the data is written to a main cache in block 306. The data is then available for further processing at the main cache in block 310. If it is a cacheable shareable write, the data is written (miss) to a DWTC or moved from the main cache and modified in the DWTC (hit) in block 308. The data is then available for further processing at the DWTC in block 312. In various embodiments the data of cacheable shareable write operations is not written into the main cache and the data of cacheable non-shareable write operations is not written in the DWTC. Each core in a multicore system can perform this method in parallel and for the same cache line as long as the processors modify different portions of (variable sitting on) the same cache line.

Figure 3B:
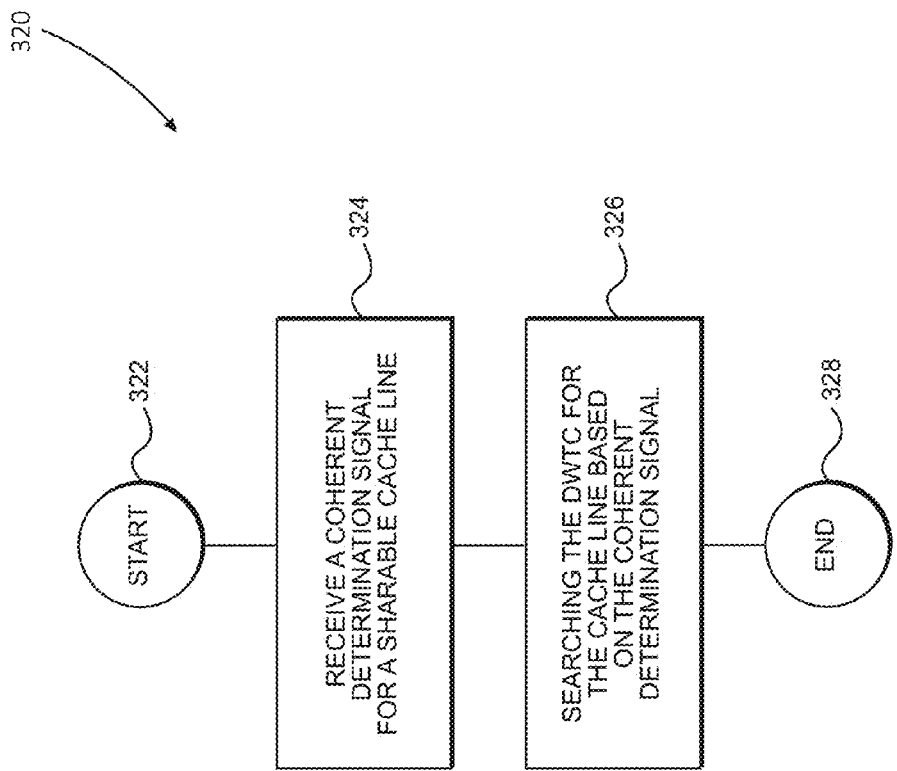
FIG. 3B shows a method for directing a coherency determination signal (e.g., snoop signal).

FIG. 3B shows a flow chart 320 for directing a coherent determination signal to the DWTC. The core or processor performs a shareable cache line modification in the DWTC in block 322 (write a shareable cache line). The core, processor or cache controller receives the coherent determination signal (such as a snoop signal) from another processor, core or cache controller requesting search of an address of a shared cache line in the cache at block 324. The cache controller performs the search of the address of the cache line exclusively in the DWTC because it is the only place where the modified shareable cache line is located at block 326. Since the DWTC is only a few lines deep, the search is fast and efficient. If the address of the cache line is found, the cache line is written back to the shareable main memory or removed from the DWTC in block 328. If the address of the cache line is not found in the DWTC the processor, core or cache controller reports the unsuccessful search back to the requesting processor, core or cache controller.

Advantageously, there will be no false sharing problem and there will be no unnecessary penalty with embodiments of this cache arrangement.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A hardware cache comprising:
    a cache controller;
    a main cache; and
    a delay write through cache (DWTC), wherein the main cache is separate and distinct from the DWTC, wherein cacheable write accesses are split into shareable cacheable write accesses and non-shareable cacheable write accesses, wherein the shareable cacheable write accesses are allocated only to the DWTC, wherein the non-shareable cacheable write accesses are not allocated to the DWTC, wherein the DWTC is small in size relative to the main cache, and wherein each portion of each cache line in the DWTC comprises a write enable qualifier.

2. The cache according to claim 1, wherein the DWTC comprises less than or equal to 16 cache lines.

3. The cache according to claim 1, wherein the DWTC is a fully associated cache.

4. The cache according to claim 1, wherein the DWTC is located in a separate and distinct region from main cache region in the cache.

5. The cache according to claim 1, wherein the DWTC is a hardware cache device that is separate and distinct from the main cache.

6. The cache according to claim 1, where the shareable cacheable write accesses are modifying an existing cache line in the DWTC.

7. The cache according to claim 1, wherein the shareable cacheable write accesses comprises moving a cache line from the main cache to the DWTC and modifying the cache line in the DWTC.

8. The cache according to claim 1, wherein the portion is a byte.

9. The cache according to claim 1, wherein the portion is a double byte.

10. The cache according to claim 1, wherein the portion is a word, a double-word or a sub-cache line.

11. The cache according to claim 1, wherein the DWTC comprises less than or equal to 32 cache lines.

12. The cache according to claim 1, wherein the DWTC comprises 4 cache lines.

13. The cache according to claim 1, wherein the DWTC comprises 8 cache lines.

14. A system comprising:
    a plurality of processors, each processor comprising a hardware cache split into a main cache and a delay write through cache (DWTC), wherein the main cache is separate and distinct from the DWTC, wherein cacheable write accesses are split into shareable cacheable write accesses and non-shareable cacheable write accesses, wherein the shareable cacheable write accesses are allocated only to the DWTC, wherein the non-shareable cacheable write accesses are not allocated to the DWTC, wherein the DWTC is small in size relative to the main cache, and wherein each portion of each cache line in the DWTC comprises a write enable qualifier;

a bus connecting the plurality of processors; and a shared main memory connected to the bus.

15. The cache according to claim 14, wherein the DWTC is a fully associated cache.

16. A method for operating a processor, the method comprising:

determining whether a write operation is a cacheable shareable write operation or a cacheable non-shareable write operation;

writing data into a hardware delay write through cache (DWTC) when the write operation is the cacheable shareable write operation; and writing the data into a hardware main cache when the write operation is the cacheable non-shareable write operation, wherein the DWTC is separate and distinct from the main cache, wherein the DWTC is small in size relative to the main cache, and wherein each portion of each cache line in the DWTC comprises a write enable qualifier.

17. The method according to claim 16, wherein the DWTC is a fully associated cache.

18. A method for receiving a coherent determination signal at a first processor from a second processor in a multicore system, the method comprising:

receiving the coherent determination signal for an address of a sharable cache line located in a hardware cache of the first processor; and solely searching a delay write through cache (DWTC) for the address, wherein the hardware cache comprises the DWTC and a main cache, wherein the DWTC is separate and distinct from the main cache, wherein the DWTC is small in size relative to the main cache, and wherein each portion of each cache line in the DWTC comprises a write enable qualifier.

19. The method according to claim 18, wherein the coherent determination signal is a snoop signal.

* * * * *